W. DUBILIER.
INSULATION TESTING DEVICE.
APPLICATION FILED AUG. 26, 1918.
1,334,141.
Patented Mar. 16, 1920.
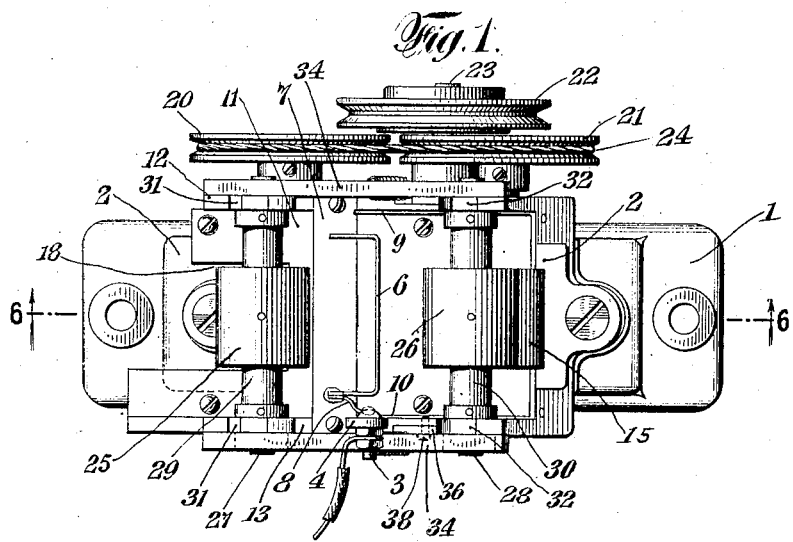
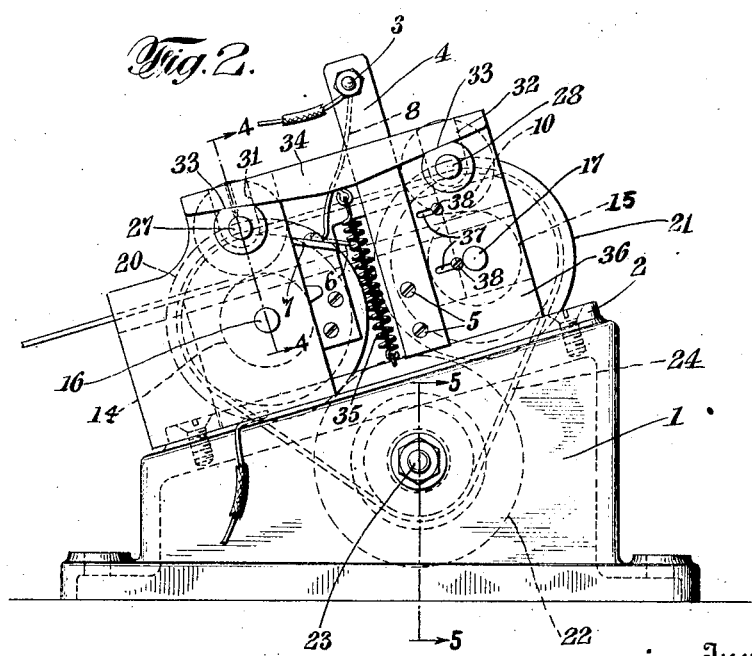

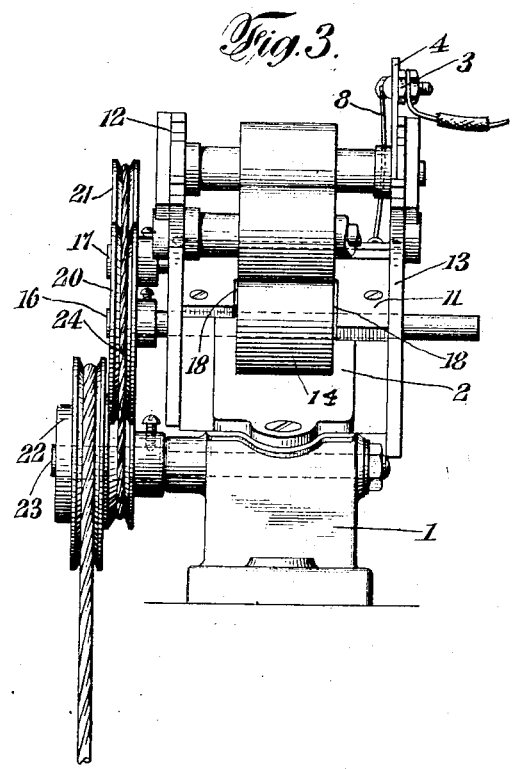
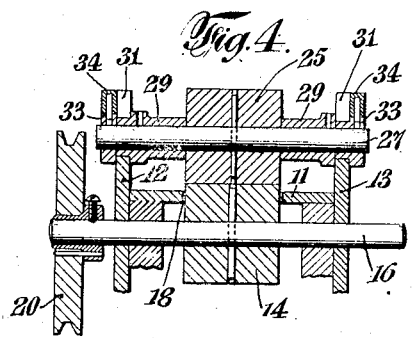
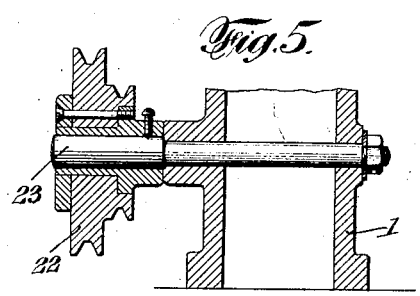
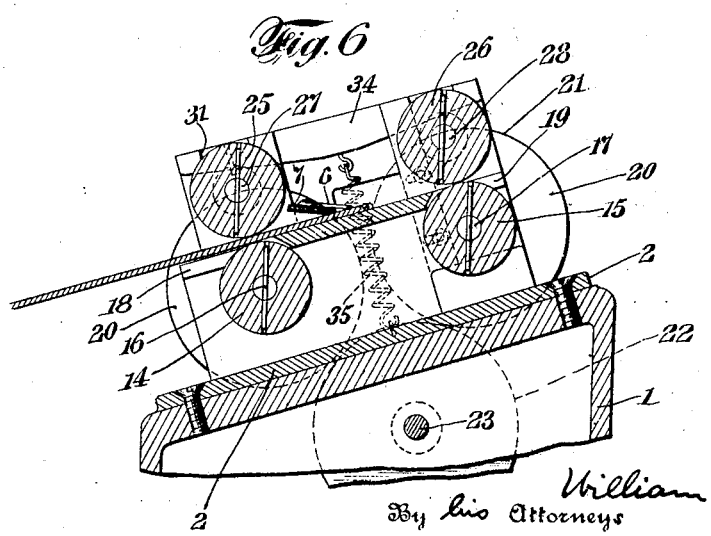

UNITED STATES PATENT OFFICE.

WILLIAM DUBILIER, OF NEW YORK, N. Y.

INSULATION-TESTING DEVICE.

1,334,141.  Specification of Letters Patent.  Patented Mar. 16, 1920.

Application filed August 26, 1918. Serial No. 251,382.

*To all whom it may concern:*

Be it known that I, WILLIAM DUBILIER, of New York city, in the county of New York, and in the State of New York, have invented a certain new and useful Improvement in Insulation-Testing Devices, and do hereby declare that the following is a full, clear, and exact description thereof.

The object of the invention is to provide a machine such that insulation, generally in sheet form, may be passed through the same to test its dielectric strength, or to expose imperfections in the insulation.

Further objects and advantages of the invention will be in part obvious and in part specifically pointed out in the description hereinafter contained in which is disclosed one embodiment of the invention, which embodiment, however, is to be considered merely as illustrative of its principles.

In the drawings:

Figure 1 is a plan view of a machine made in accordance with the invention;

Figs. 2 and 3 are respectively a side and front elevation of the machine shown in Fig. 1, Figs. 4 and 5 are sections taken respectively on lines 4—4 and 5—5 of Fig. 2; and Fig. 6 is a longitudinal section of the machine taken on line 6—6 of Fig. 1.

The form of the invention disclosed is constructed to be suitable for use in connection with insulating sheets, such as the mica sheets employed in electrical condensers, but the invention is applicable for insulation testing purposes in general, whether the insulation be in continuous, or detached sheets.

Referring to the drawings, there is disclosed a machine having a base 1, which supports a frame 2 adapted to carry the several elements of the machine. To conduct to the machine the electrical potential necessary to test insulation, a terminal 3 is employed, such terminal being carried by an insulating post 4 secured to the frame 2, as by suitable screws 5 (Fig. 2). A source of electrical energy (not shown) of the high potential necessary to impress the requisite strain upon the insulation, will be understood as connected to the terminal 3. An electrode 6, suitably mounted upon an insulating strip 7, is disposed adjacent the path of travel of the insulation through the machine, and is connected to terminal 4 by a lead 8 so that the insulation is subjected to the potential of such electrode 6 throughout substantially its entire surface. A discharge gap is formed between electrode 6 and another conducting member which forms the other electrode of the gap; in the present instance the metal of the machine in combination with electrode 6, forms such a discharge gap. Insulating strips 9 and 10 (Fig. 1) may be interposed between the electrode 6 and the side walls of the machine, to prevent a discharge to undesired points.

To maintain the insulation in proper relation to the electrode 6, as it passes through the machine, a guide plate 11 may be secured to the frame 2, and such guide plate, together with side plates 12 and 13, insures that the travel of the insulation will be restricted to the proper path.

In case the machine is to operate upon detached sheets of insulation, it is desirable to provide a positive feed for such sheets as they pass through the discharge gap. To accomplish this, a pair of rollers 14 and 15 are provided in the present machine, such rollers being mounted on opposite sides of the gap, respectively upon shafts 16 and 17, and projecting respectively through slots 18 and 19 in the guide plate 11, so that their surfaces bear against the insulation frictionally as it passes over the guide plate. Driving pulleys 20 and 21 may also be mounted upon shafts 16 and 17, in case it is desired to have the machine feed the insulation positively. Suitable driving devices for the pulleys 20 and 21 will be provided, such as a pulley 22, mounted on a shaft 23 and connected to the pulleys 20 and 21 by means of a belt 24.

An additional pair of rollers 25 and 26 may also be provided adjacent the first mentioned rollers 14 and 15 in order to press the insulation firmly into engagement with the latter. As shown, rollers 25 and 26 are mounted respectively on shafts 27 and 28, which shafts are provided with collars 29 and 30, the collars being supported in slots 31 and 32 in the side plates 12 and 13, and having flats 33 which are engaged by a pair of beams 34 pressed by springs 35 so as to force the rollers 25 and 26 toward rollers 14 and 15 and hold the insulation firmly against the latter.

In instances where the machine is to be used with detached insulating sheets of varying sizes, it may be desirable to adjust the distance between the rollers and the discharge gap; for this purpose, in the present form, rollers 15 and 26 are mounted on bearing plates 36, which overlap the side plates 12 and 13, and which are provided with slots 37 coacting with screws 38 to hold the rollers 15 and 26 at the proper distance from the discharge gap for the particular size of insulating sheet being tested.

As the insulation is fed into the machine on guide plate 11, the roller 14 will bear against the sheet, and, if such roller is power actuated, will force the insulating sheet between the electrode 6 and the guide plate, where any imperfections in the insulation will be exposed by a discharge from electrode 6 through the insulation to the metal of guide plate 11. Roller 15 will then pick up the forward end of the sheet, and discharge the same from the machine. It will be noted that the electrode 6 extends substantially across the entire path of travel of the insulation as the latter passes through the machine, and thus insures that all portions of the insulation will be subjected to the necessary strain during the operation.

While a specific form of the invention is disclosed, it will be obvious that many changes may be made without departing from the spirit of the invention, as defined in the following claims.

I claim:

1. An insulation testing device comprising a pair of electrodes spaced to provide a gap, a high potential source of energy connected to said electrodes, whereby the gap is bridged by the current imposed thereon when the gap is unobstructed, and means for progressively feeding sheet insulation between said electrodes, whereby the current bridges the gap whenever the strength of the insulation fed therethrough falls below a predetermined point.

2. An insulation testing device comprising a pair of electrodes spaced to provide a gap, a high potential source of energy connected to said electrodes, whereby the gap is bridged by the current imposed thereon when the gap is unobstructed, means for progressively feeding sheet insulation between said electrodes, whereby the current bridges the gap whenever the strength of the insulation fed therethrough falls below a predetermined point, and a guide associated with said gap providing a runway for leading the insulation through the gap.

3. An insulation testing device comprising a pair of electrodes providing a discharge gap therebetween, and mechanism for frictionally engaging sheet insulation to feed the same forwardly through said gap.

4. An insulation testing device comprising a frame having electrodes thereon providing a discharge gap, a guide adjacent such gap, and a roller adjacent such guide having a surface adapted to frictionally engage sheet insulation to feed the same through said gap.

5. An insulation testing device comprising a frame having electrodes thereon providing a discharge gap, a guide adjacent such gap, rollers having frictional bearing surface adjacent the surfaces of such guide, said rollers being disposed respectively forwardly and rearwardly of said gap, and means for rotating said rollers to frictionally feed sheet insulation progressively through such gap.

6. An insulation testing device comprising a frame having electrodes thereon providing a discharge gap, a guide adjacent such gap, a roller adjacent such guide having a frictional surface adapted to engage sheet insulation to feed the same through said gap, and means for pressing the insulation against such roller.

7. An insulation testing device comprising a frame having electrodes thereon providing a discharge gap, a guide adjacent such gap, rollers having frictional bearing surfaces adjacent the surfaces of such guide, said rollers being disposed respectively forwardly and rearwardly of said gap, and means for pressing the insulation against such rollers.

8. An insulation testing device comprising a frame having electrodes thereon providing a discharge gap, a guide adjacent such gap, rollers having their bearing surfaces adjacent the surfaces of such guide, said rollers being disposed respectively forwardly and rearwardly of said gap, and additional rollers yieldingly pressed toward said first mentioned rollers.

9. An insulation testing device comprising a pair of electrodes spaced to provide a gap, a high potential source of energy connected to said electrodes, whereby the gap is bridged by the current imposed thereon when the gap is unobstructed, and a movable member adjacent said gap having a frictional bearing surface adapted to engage sheet insulation and feed the same through said gap, whereby the current bridges the gap whenever the strength of the insulation fed therethrough falls below a predetermined point.

10. An insulation testing device comprising a pair of electrodes providing a discharge gap, and movable feeding members disposed respectively on opposite sides of such gap, said members having frictional bearing surfaces adapted to engage sheet insulation as the same is fed through such gap.

11. An insulation testing device comprising a pair of electrodes providing a discharge gap therebetween, a movable feeding member having a frictional bearing surface adapted to engage sheet insulation and feed the same through such gap, and means for pressing the insulation against such bearing surface.

12. An insulation testing device comprising a pair of electrodes spaced to provide a gap, a high potential source of energy connected to said electrodes, whereby the gap is bridged by current imposed thereon when the gap is unobstructed, rollers disposed on opposite sides of such gap, and means to actuate said rollers to feed sheet insulation through said gap, whereby the current bridges the gap whenever the strength of the insulation fed therethrough falls below a predetermined point.

13. An insulation testing device comprising a pair of electrodes providing a discharge gap, rollers disposed on opposite sides of such gap, and additional rollers pressed toward said first mentioned rollers.

14. An insulation testing device comprising a pair of electrodes providing a discharge gap, rollers disposed on opposite sides of such gap, additional rollers pressed toward said first mentioned rollers, and means for actuating said rollers to feed sheet insulation between adjacent rollers and through said gap.

15. An insulation testing device comprising a pair of electrodes providing a discharge gap therebetween, a roller disposed adjacent such gap having a frictional surface adapted to engage sheet insulation fed through the gap, and means for adjusting the distance between the roller and the gap.

16. An insulation testing device comprising a pair of electrodes providing a discharge gap, rollers disposed on opposite sides of such gap, at least one of said rollers having a frictional surface adapted to engage sheet insulation and feed the same along relative to the gap, and an adjustable bearing for one of said rollers for adjusting the distance between said roller and gap.

In testimony that I claim the foregoing I have hereunto set my hand.

WILLIAM DUBILIER.